United States Patent Office 3,526,609
Patented Sept. 1, 1970

3,526,609
ADDITION OF AMINE TO AQUEOUS NYLON-DELUSTERING SLURRIES
David Lee Sharps, Martinsville, Va., assignor to E. I. du Pont de Nemours and Company, Wilmington, Del., a corporation of Delaware
No Drawing. Filed Nov. 5, 1965, Ser. No. 506,589
Int. Cl. C08g 51/04; C08k 1/06
U.S. Cl. 260—37    4 Claims

ABSTRACT OF THE DISCLOSURE

Delustered or pigmented polyamides may be prepared which have less filter plugging tendency by adding an aqueous slurry of a finely-divided pigment or delustering agent to the polymer during its preparation, the slurry containing a small amount of an amine such as to provide a concentration of at least 1.5 millimoles per kilogram of the slurry.

---

This invention relates to an improved process for preparation of synthetic linear polyamides containing a delustering or pigmenting agent.

In the preparation of synthetic polyamides for extrusion into fibers or other shaped articles, relatively small quantities of pigments such as titanium dioxide are frequently added to the polymer prior to extrusion to reduce the luster or for other purposes. G. P. Hoff in U.S. Pat. No. 2,278,878 describes a suitable method for addition of a finely-divided inert material during the preparation of the polymer. However, in the extrusion of delustered or pigmented polymers by prior art procedures to form fibers, there is a substantial increase in the rate of plugging of the filtering element preceding the spinneret. This results in more frequent changing of the spinneret assembly than is the case with polymers which do not contain a pigment or delustering material. Further improvement in the dispersion of the pigment in the polymer to reduce filter plugging is therefore desired.

It has now been found that delustered or pigmented synthetic polyamides with less filter plugging tendency may be prepared by adding an aqueous slurry of a finely-divided pigment or delustering agent to the polymer during its preparation, the slurry containing a small amount of an amine. The amount of amine added should be sufficient to provide a concentration of at least 1.5 millimoles kg. of the aqueous slurry.

Amines suitable for use in the practice of this invention include aliphatic amines such as ethylamine, diamines such as ethylene diamine, propylene diamine, etc., containing from 2 to 14 carbon atoms, aromatic diamines such as meta and paraxylylene diamine and cycloaliphatic diamines such as bisparaminocyclohexylmethane. The preferred amines are primary diamines containing 6–14 carbon atoms. Where the polyamide is prepared by the reaction of a diamine with a dibasic acid, it is preferable that the diamine selected for addition to the aqueous slurry of delustering agent be the same as that employed in the preparation of the polyamide. However, it is not essential that this be the case since the relatively small amount of different amine would generally not be harmful.

The following examples are cited to illustrate the invention. They are not intended to limit it in any manner.

EXAMPLE I

A 49% aqueous solution of hexamethylene-diammonium adipate (6–6 salt solution) and a 31% aqueous solution of hexamethylenediammonium sebacate (6–10 salt solution) are added to an evaporator in sufficient quantities to provide 1,498 lbs. of the dry 6–6 salt and 1,457 lbs. of dry 6–10 salt. The resulting salt solution is then evaporated to a 75% concentration level, at which point the temperature is about 132° C. at a pressure of 13 p.s.i. The 75% salt solution is charged to an autoclave and heated to a temperature of about 205° C. and a pressure of 250 p.s.i. At this point, 36 lbs. of an aqueous slurry containing 20% by weight of finely-divided titanium dioxide is added to the autoclave. The slurry is prepared in the conventional manner and is adjusted to a pH of 9.5 by addition of ammonium hydroxide. In addition, 10 ml. of aqueous 65% hexamethylenediamine solution (3.2 millimoles kg.) is added to the slurry prior to the addition to the autoclave. The reaction mixture is then heated to a temperature of about 225° C. at 250 p.s.i., about 60 minutes being required for the heating operation, and 0.003% by weight of manganous hypophosphite is added as a light degradation stabilizer. The pressure is then reduced over a period of 80 minutes to atmospheric pressure and the temperature is increased to 260–265° C. The resulting copolymer is held for 30 minutes at this temperature, extruded in the form of a ribbon, quenched on a water-cool casting wheel, and cut into flake in the conventional manner. The flake is melted and extruded through a spinneret assembly having a sand filter of the type described by G. D. Graves in U.S. Pat. No. 2,266,363. The average increases in pressure in pounds per square inch over periods of 19 and 72 hours due to plugging of the sand filter are 5.3 and 4.16, which average 113 pounds per square inch over 24 hours. Polymer prepared and extruded in identical fashion except that the diamine is omitted from the delusterant slurry gives an average pressure increase of 244 pounds per square inch over 24 hours based on a 101-hour observation wherein pressure increased an average of 8.9 pounds per square inch per hour.

EXAMPLE II

A different batch of polymer is prepared and a different batch of delusterant slurry is added following the procedure of Example I except that the concentration of hexamethylenediamine is doubled to give a concentration of 6.4 millimoles kg. of slurry. When this polymer is extruded as in Example I, the extrusion pressure rises at an average rate of 154 pounds per square inch over 24 hours based on a 39-hour observation wherein the pressure increased an average of 6.4 pounds per square inch per hour. A comparable polymer prepared without the addition of the diamine gives a pressure increase of 586 pounds per square inch over 24 hours based on a 45 hour observation wherein the pressure increased an average of 24.4 pounds per square inch per hour.

As can be seen from the above examples, the addition of diamine to the delusterant slurry surprisingly gives a decrease in filter plugging, as indicated by the lower rise in extrusion pressure, sufficient to increase the life of the spinneret assembly more than two-fold.

The diamine may be added at any suitable stage in the preparation of the aqueous slurry of delustering agent or pigmenting material. Such slurries are prepared by procedures which are well known to those skilled in the art and usually involve passing the slurry of finely-divided material through a suitable attrition mill such as a ball mill.

Aqueous slurries of titanium dioxide are usually more stable when they are slightly alkaline. If desired, the amine may be used alone to adjust the pH to the desired level of about 9.5, however, another alkali such as ammonium hydroxide may also be added if desired.

For effective results, at least about 1.5 millimoles of the amine should be added for each kg. of the slurry. The upper limit of diamine concentration is not critical, however, for practical purposes the amount will normally be kept at the minimum required to achieve the desired reduction in filter plugging. Generally, the preferred concentration will be in the range of 1.5 to 12 millimoles kg. of aqueous delusterant slurry.

This invention may be applied in the delustering of various polyamides as, for example, those described in U.S. 2,130,523. It is especially desirable for use with polyamides which tend to gel easily and thus require relatively high extrusion pressures. Such polyamides include polyhexamethylene adipamide, polyhexamethylene sebacamide, polyhexamethylene isophthalamide and copolymers thereof.

The delusterant slurry may be added at any time during the preparation of the polymer but is preferably added after the polymerization has begun but prior to completion of the polymerization reaction. Most desirably, the addition is made after the ebullition of water from the reaction mass has begun but before a substantial increase in viscosity has taken place. Under these conditions, dispersion of the polymer is good and the effect of the diamine addition to the slurry is most beneficial.

While the invention has been described in terms of primary amines for illustrative purposes, secondary and tertiary amines are also suitable.

Many equivalent modifications of the above invention will be apparent to those skilled in the art from a reading of the above without a departure from the inventive concept.

What is claimed is:

1. In a process of forming a polyamide from an aqueous solution of an aliphatic diammonium alkanedioate in the presence of a finely divided delustering agent, the improvement which comprises adding the said delustering agent to the said solution in the form of an aqueous slurry, the said slurry containing from about 1.5 to about 12 millimoles of a primary, dibasic amine per kilogram of slurry of said delusterant.

2. The process of claim 1 wherein the said diamine is hexamethylene diamine.

3. The process of claim 2 wherein the said delusterant is titanium dioxide.

4. The process of claim 3 wherein the said delusterant slurry contains sufficient ammonium hydroxide to provide a pH of about 9.5 before addition of the said amine.

References Cited

UNITED STATES PATENTS 2,205,722   11/1936   Graves.

FOREIGN PATENTS 696,425   10/1964   Canada.

MORRIS LIEBMAN, Primary Examiner

R. H. ZAITLEN, Assistant Examiner